United States Patent Office 2,814,599
Patented Nov. 26, 1957

2,814,599

GROUP III METAL COMPOUND PROMOTED PLATINUM OR PALLADIUM CATALYST

Philip A. Lefrancois, Cranford, Earl W. Riblett, Tenafly, and William P. Burton, Little Silver, N. J., assignors to The M. W. Kellogg Company, Jersey City, N. J., a corporation of Delaware No Drawing. Application April 17, 1953,
Serial No. 349,562

12 Claims. (Cl. 252—466)

This application relates to a novel platinum and/or palladium catalyst and to a method of employing same in chemical reactions, and more particularly, pertains to a novel platinum and/or palladium catalyst which has exceptionally high activity for the conversion of hydrocarbons, for example, the reforming of light hydrocarbon oils to produce gasoline of high anti-knock value.

Platinum catalysts are used extensively in reforming operations for producing gasolines of high anti-knock value. These catalysts possess a highly selective property producing unusually hitgh yields of reformed liqud product. The improvement in the selective nature of a platinum catalyst is limited by reason that high yields are now obtained and that the reaction temperatures used will produce some gaseous product material and coke; consequently, great effort is being made to develop platinum catalysts having exceptionally high activities for reforming reactions. A highly active platinum catalyst permits the use of relatively small quantities of catalyst for reforming a given volume of oil as compared to a catalyst having a relatively lower activity. Since platinum catalysts are expensive to manufacture, it is important to employ a platinum catalyst of as high an activity as is possible in order to require a smaller amount of catalyst for a given result, and hence, a lower investment cost for the process. By means of the present invention, a novel catalyst is proposed which possesses an exceptionally high activity, particularly in regard to an operation involving the reforming of light hydrocarbon oils as, for example, a naphtha fraction.

It is an object of this invention to provide a novel platinum and/or palladium catalyst.

Another object of this invention is to provide chemical reactions involving a novel platinum and/or palladium catalyst.

Still another object of this invention is to provide a novel platinum and/or palladium catalyst which possesses an exceptionally high activity for reforming operations.

Other objects and advantages will become apparent from the following description and explanation thereof.

In accordance with the present invention, a novel catalyst comprises platinum and/or palladium in combination with a minor quantity of a compound of a group III metal having an atomic number of at least 21 and not more than 89 supported on a carrier material. This catalytic material can be used in a variety of chemical reactions, although it is particularly active for the conversion of hydrocarbons such as, for example, the reforming of light hydrocarbon oils to produce gasolines of high anti-knock value.

The primary activating agent of the present invention comprises a compound of a group III metal having an atomic number of at least 21 and not more than 89. The metals of group III which fall within this definition are gallium, indium, scandium, yttrium, lanthanum, thallium and actinium. These metals are present in the finished catalyst in the form of a compound such as, for example, the oxides, sulfides, carbonates, phosphates, sulfates, halides, aluminates, silicates and alumino-silicates. The primary activating agent comprises a minor amount of the total platinum and/or palladium catalyst. Generally, the primary activating agent comprises about 0.05 to about 20%, more usually, about 0.1 to about 10%, and preferably, about 0.3 to about 5%, based on the total weight of the catalyst. Specific examples of the primary activating agent are gallium oxide, platinum gallate, gallium aluminate, indium sesquioxide, thallous oxide, thallous sulfate, gallium sulfate, etc.

The catalysts of the present invention are prepared by a variety of methods. As previously indicated, the platinum and/or palladium containing material includes the catalytic elements in the metallic form or as a compound. In the metallic form, the platinum and/or palladium containing material can be, for example, platinum black or finely divided platinum and/or palladium, for admixture with a suitable carrier material. More frequently, it is found that the platinum and/or palladium containing material is employed as a compound such as, for example, chloroplatinic acid; chloropalladic acid; ammonium-, potassium- and sodium salts of chloroplatinous and chloropalladic acids; platinic sulfide; palladium sulfide; an ammine complex of platinum and/or palladium; etc. The platinum or palladium sulfides can be prepared by employing chloroplatinic or chloropalladic acids and treating them with hydrogen sulfide or ammonium polysulfide to derive the desired metallic sulfides. More specific examples of the precursor materials mentioned above will be given hereinafter.

The carrier material which is employed in the preparation of the platium and/or palladium catalysts also includes a large number of materials. For example, the carrier material can be silica, alumina, zinc spinel, titania, charcoal, thoria, zirconia, pumice, kieselguhr, fuller's earth, "Superfiltrol," magnesia, silica-alumina with titania, silica-magnesia, etc. The carrier material in a narrower aspect is an inorganic metal oxide, which is preferably not reducible at a temperature below about 1200° F. Furthermore, the catalyst may also contain combined halogen such as, for example, fluorine, chlorine, etc. The halogen content of the catalyst can be from about 0.01 to about 10% by weight, preferably about 0.2 to about 8% by weight, based on the total catalyst. It was found that an excellent carrier material comprises alumina having incorporated therein a small amount of silica, namely, in the amount of 0.1 to about 12% by weight, more usually, about 1 to about 10% by weight, based on the total catalyst. Silica in such small proportions enhances the stability of the catalyst at elevated temperatures, and also, it serves to inhibit non-selective cracking reactions, which result in the production of coke and normally gaseous hydrocarbons, when the catalyst is employed in a hydrocarbon conversion process. As previously indicated, the carrier material can be incorporated in the hydrous and/or hydrated form or it can be a material which has been previously dried and/or calcined. In any case, the carrier material is combined with the platinum and/or palladium containing material, and then further treated in accordance with the procedure which will be more fully described hereinbelow. In the finished catalyst, the platinum or palladium can constitute about 0.01 to about 5%, more usually, about 0.1 to about 2.5%, based on the total weight of the catalyst. The catalyst may contain larger quantities of platinum or palladium such as, for example, up to about 15% by weight, however, usually, this may not be desirable for economical reasons.

Alumina is an excellent support material for the catalyst of the present invention. Alumina can be prepared by a variety of methods and all of these are satisfactory for the purposes of this invention. In the preparation of alumina, aluminum, water and an acid such as, for example, formic acid, acetic acid or hydrochloric acid, and mercury or mercuric oxide are reacted under suitable conditions and proportions to produce a hydrous or hydrated alumina or alumina sol. The alumina sol is then treated with an alkaline reagent, e. g., ammonium hydroxide, in order to effect a gelation. In the treatment of the alumina sol with an alkaline reagent, it is desirable to adjust the pH to a value between about 5 to about 12. The alumina can also be prepared by reacting aluminum, water and mercury or mercuric oxide at an elevated temperature, preferably at the boiling point of the solution. The alumina thus produced then can be optionally treated with an alkaline reagent, e. g., ammonium hydroxide. Another method for preparing alumina is to precipitate alumina gel from an aluminum salt, e. g., aluminum chloride, aluminum sulfate, aluminum nitrate, etc., by means of an alkaline reagent, e. g., ammonium hydroxide. The precipitation is conducted at a pH of between about 3.5 to 7. The gel thus produced can then be further treated with an alkaline reagent, e. g., ammonium hydroxide, with or without aging for a suitable period of time. In all of the preparations of alumina given above, it is also intended that the alumina may be aged, with or without treatment by means of an alkaline reagent, for a period of at least about 10 hours, preferably, at least about 17 hours. The alumina prepared by the methods described above will be either gamma- or eta-alumina or mixtures of the two after calcination.

A catalyst preparation which can be used for the present invention comprises a platinum and/or palladium ammine complex as the means of supplying the catalytic agent. The platinum or palladium ammine complex is prepared from ammonia or substituted ammonia compounds, e. g., the amines and a platinum or palladium compound. The methods for preparing the ammine complexes are readily known, to those skilled in the art, to involve complexing a platinum or palladium compound, such as a salt, e. g., a halide, nitrate, sulfate, sulfite, nitrite, oxyhalide, etc., with ammonia or substituted ammonia, e. g., alkylamine, alkyldiamine, quinoline, pyridine, hydrazo compounds, hydroxylamine, etc. The platinum or palladium in the complex may have a coordination valence of 4 or 6. The ammine complexes may be soluble in a polar or non-polar solvent which is employed for facilitating the catalyst preparation, or such ammines can be colloidally dispersed in either a polar or non-polar solvent in the required quantities. In either case, the solution or suspension of ammine complex should be employed in quantities which will provide adequate distribution of the complex throughout the entire catalyst mixture in the desired manner. However, it is preferred to employ the water soluble ammine complexes by reason that these compounds result in very effective types of catalysts. Specific examples of complexes which may be suitable for this invention include nitritodihydroxylaminoammineplatinous chloride, nitritoethylenediaminoammineplatinous chloride, nitritopyridinodiammineplatinous chloride, tetrahydrazinoaminoplatinous chloride, dihydrazinodiammineplatinous chloride, tripropylenediaminoplatinic chloride, nitritodichloroethylenediaminoethylammineplatinic chloride, dichloroquatermethylaminoplatinic chloride, dichlorobisethylenediaminoplatinic chloride, chlornitritopyridinotriammineplatinic chloride, tetrahydroxylaminoplatinous chloride, hydroxylaminotriammineplatinous chloride, quatermethylaminoplatinous chloride, bismethylaminodiammineplatinous nitrate, dihydrazinodiammineplatinous chloride, quaterpyridinoplatinous sulfate, bispyridinopalladic chloride, biethylenediaminopalladous chloride, etc.

The relative quantities of the platinum or palladium ammine complex and of the carrier material are determined by the final composition of the catalyst which is desired. Ordinarily, the quantity of metallic platinum or palladium in the final catalyst product ranges from about 0.01 to about 5% by weight. Therefore, the quantity of platinum or palladium ammine complex which is combined with the carrier material is determined on the basis of the desired quantity of metallic platinum or palladium in the final catalyst composition. Likewise, the amount of support material will be determined by difference. For hydroforming hydrocarbons, the concentration of platinum and palladium in the catalyst product should be in the range of about 0.1 to 1% by weight of the metal, because the benefits derived from higher quantities of platinum are usually not justified by the cost of the platinum material used in preparing the catalyst.

The ammine complex can be combined with the carrier material in any manner which is described hereinafter. The ammine complex can be mixed with the carrier material in the gel or sol form and this mixture is then admixed with the primary activating agent before or after drying and/or calcination. Alternatively, the ammine complex is mixed with the carrier material in either the dried and/or calcined state, before or after impregnation with the primary activating agent, and the entire mixture is then dried and calcined.

After the ammine complex has been thoroughly mixed with the carrier material and primary activating agent in the manner described above, the mixture is dried and calcined. Usually, drying can be accomplished by heating at a temperature not greater than about 400° F., preferably about 200° to about 250° F., and for a period of about 15 to about 50 hours. Alternatively, the slurry can be dried and calcined in a single operation by being placed in an oven which is maintained at the temperature in the order of at least about 600°–700° F. The calcination procedure is important, because the ammine complex is therein decomposed to metallic platinum or palladium. The decomposition of the ammine complex can take place at a temperature of at least about 400° F. It is the general practice to calcine the catalyst mass at a temperature of at least about 600° F., and a temperature up to about 1500° F., for a period from about 2 to about 6 hours. However, it is preferred to calcine the mixture of carrier material and the platinum and palladium ammine complex at a temperature between about 700° to about 1200° F. for about 3 to 6 hours. Calcination appears to be about the best method of reducing the ammine complex. However, it is also contemplated to reduce the complex by passing hydrogen over the dry material at moderately elevated temperatures. Further, the metal may be deposited on the carrier material before drying by the addition of a reducing agent such as, for example, hydrazine or citric acid, to the ammine complex.

The advantages of the present invention can also be realized for a catalyst which is prepared by the method comprising the decomposition of a compound of a metal selected from the class consisting of platinum and palladium to form a metallic residue on a carrier material in the presence of a metal, such as mercury, zinc or cadmium or a compound thereof. Such materials serve as secondary activating agents in producting catalysts of substantially higher activity. The secondary activating agent may remain in the final catalyst in certain instances, however, preferably it is a volatile material which evaporates or decomposes, either at or below the temperature at which the catalyst is calcined, or at the operating temperature at which the catalyst is maintained under conversion or regeneration conditions.

The secondary activating agent can be used in the form of an organic or inorganic compound of mercury, zinc or cadmium, or mixtures of the foregoing compounds. The inorganic compounds of mercury, zinc or cadmium include the oxides, hydroxides and salts thereof. The inorganic salts of mercury, zinc and cadmium include, for example, the chlorides, chlorates, bromides, nitrates, sulfates, nitrites, sulfides, sulfites, carbonates, bicarbonates, oxychlorides, fluorides, iodides, phosphates, phosphites, etc. Specific examples of inorganic compounds of mercury, zinc and cadmium are mercuric bromide, mercuric chloride, mercuric chlorate, mercuric cyanide, mercuric nitrate, zinc bromide, zinc chlorate, zinc hydroxide, zinc nitrate, zinc sulfide, cadmium carbonate, cadmium hydroxide, cadmium cyanide, cadmium iodide, etc.

The organic compounds of mercury, zinc and cadmium which are useful as secondary activating agents include a variety of classes such as, for example, the salts of the aliphatic and aromatic carboxylic acids, the aliphatic and aromatic sulfur salts, as well as the aliphatic and aromatic phosphorus acids, etc. Particularly useful compounds of mercury, zinc and cadmium are the aliphatic carboxylic salts, such as those derived from the fatty acids, the carbonic acids, the thiocarbonic acids, etc. Specific examples of secondary activator salts of the aliphatic carboxylic acids are the monobasic type such as, for example, mercurous acetate, mercuric propionate, mercuric butyrate, mercuric valerate, zinc acetate, zinc formate, zinc caproate, cadmium acetate, cadmium propionate, mercury ethyl carbamate, mercury propyl carbamate, zinc butyl carbamate, cadmium pentyl carbamate, mercury ethyl xanthate, zinc propyl exanthate, cadmium butyl xanthate, etc. The aliphatic polycarboxylic acids can also be used. Useful mercury, zinc and cadmium salts of aromatic carboxylic acids can be of the mono- or polybasic type. Examples of such salts are mercuric phthalate, zinc phthalate, cadmium phthalate, mercurous salicylate, zinc salicylate, cadmium salicylate, etc.

It is preferred that the secondary activating agent volatilizes from the catalyst mass at or before calcination temperature. In some instances, the secondary activating agent is not volatilized at such temperatures, consequently, the calcination operation may be conducted under subatmospheric pressures in order to remove substantially all or completely the activating agent from the catalyst mass. Moreover, it is preferred to employ secondary activating agents which volatilize from the catalyst mass at a temperature not greater than about 1200° F.

Ordinarily, in the preparation of the catalyst, the secondary activating agent can be added to the carrier material prior to the addition of the platinum or palladium containing material and primary activating agent; or the secondary activating agent can be added to the mixture of carrier material, primary activating agent, and platinum or palladium containing material; or the addition of the secondary activating agent can be made to the platinum or palladium containing material prior to mixing the carrier and primary activating agent therewith. The quantity of secondary activating agent employed is about 0.01 to about 10.0% preferably about 0.5 to about 5.0%, based on the weight of the carrier. For example, a mercury compound should be mixed with a carrier such as, for example, alumina gel in such proportions as to produce a mercury to alumina dry weight ratio of about 0.0001 to 0.1 or higher. In this type of a preparation, the action of the secondary activating agent is not completely understood, although it produces an effect on the catalyst which greatly enhances its activity. Whatever may be the change in the catalyst resulting from the introduction of the secondary activating agent into the mixture of constituents from which the catalyst is manufactured, it is not necessary that the secondary activating agent remain in the final catalyst product. As a practical matter, it is preferred to employ secondary activating agents which volatilize below about 1000° F. or 1050° F. and which will leave no apparent trace of residue in the finished catalyst.

In our method of preparation of catalyst with a secondary activating agent, the platinum or palladium is distributed on the carrier by employing initially a compound of a metal which will decompose to form metallic platinum or palladium at calcination temperatures. The desired form of the starting material can be prepared by saturating an aqueous solution of chloroplatinic acid or chloropalladic acid with hydrogen sulfide. Other starting materials can be employed such as, for example, platinum ammine complexes, chloroplatinic acid, ammonium and potassium chloroplatinates and chloroplatinites, the corresponding palladium compounds and the like. A platinum or palladium containing material having the catalytic element in the metallic form can also be used. Those platinum or palladium compounds which are readily decomposable or reducible to metallic platinum or palladium by heating or by the action of reducing agents usually produce the best type of catalyst. The metallic platinum or palladium content of the final catalyst should be from about 0.01 to about 5.0% by weight, preferably about 0.1 to about 1.0%.

In the preparation of the catalyst a promoting agent can be used which will be described more fully hereinafter. The promoting agent can be incorporated into the catalyst mass by the following methods: (1) with the carrier material either before or after drying and/or calcination; (2) with the primary and/or secondary activating agents described above; (3) with platinum or palladium containing material; or (4) the promoting agent can be added to a mixture of any two or more of the materials discussed above. After the primary activating agent with or without the secondary type, the platinum or palladium containing material, the carrier material and with or without the promoting agent have been thoroughly mixed, the mixture is dried and calcined. The drying operation can be conducted at a temperature of not more than about 400° F., preferably about 200° to 250° F. for a period of about 15 to 50 hours. Alternatively, the drying can be accomplished by a flash technique which involves introducing a slurry of catalyst mass into an oven which is maintained at an elevated temperature, for example, at least about 600–700° F. After drying the catalyst mass, it is treated at a temperature of at least about 400° F., more usually, at a temperature in the range of about 600° to about 1500° F., preferably about 700° to about 1200° F., and for a period of about 2 to 6 hours or more.

The function of the promoting agent is not clearly understood, however, the resultant activity of the catalyst material prepared by employing the promoting agent is increased. The promoting agent includes a variety of classes of compounds such as, for example, primary, secondary and tertiary aliphatic monohydric alcohols, aliphatic dihydric alcohols, aliphatic trihydric alcohols, ketones of the aliphatic and aromatic type, aromatic alcohols, etc. The alcohols can be those in which there are present groups such, as for example, amino, sulphydryl, nitro, nitroso, halogen, alkoxyalkyl, carboalkoxy, etc. Among the aliphatic alcohols, it is preferred to employ the alkanols containing about 1 to 9 carbon atoms in the molecule. With respect to aliphatic polyhydric alcohols, it is preferred to employ those containing not more than 10 carbon atoms in the molecule. The ketones may comprise the aliphatic or the aromatic type, however, it is preferred using the aliphatic ketones, particularly the alkanones containing not more than 4 carbon atoms in the molecule. It is to be noted that in the case of the promoting agents, it is desired that they possess a water solubility of at least about .05% by weight at 70° F.

For the purposes of this specification and the appended claims, it is intended that "water solubility" of the promoting agent will be the minimum solubility just mentioned. Water solubility is important from the standpoint of obtaining uniform distribution of the promoting agent through the catalyst mass prior to drying and calcination. The components of the catalyst prior to drying and calcination may be in the form of a slurry or gel which contain sufficient amounts of water to provide for adequate distribution of the promoting agent. It is possible to employ a material having a lower solubility than indicated hereinabove, however, it will be found that less satisfactory results are produced with respect to catalyst activity. It is preferred that the promoting agent is volatilized from the catalyst mass at a temperature of about or below the calcination point. This is desired in order to avoid the deposition of undesirable cracked products on the finished catalyst product. The following are specific examples of promoting agents which are useful for the purposes of the present invention; methanol, ethanol, propanol, butanol, pentanol, hexanol, heptanol, ethylene, glycol, propylene glycol, glycerol, acetone, methyl ethyl ketone, methyl propyl ketone, phenols, benzyl alcohol, etc.

Generally, the promoting agent of the present invention is incorporated into the catalyst mass by one of the following methods: (1) it is combined with the carrier material prior to mixing with the platinum or palladium containing material with or without the primary and/or secondary activating agent; (2) by mixing the promoting agent with the platinum or palladium containing material prior to mixing with the other components of the catalyst mass; (3) mixing the promoting agent with the primary and/or secondary activating agents prior to incorporation of same with either the carrier material or the platinum or palladium containing material; or (4) mixing the promoting agent with a mixture of the catalyst components prior to the drying or the calcination operation. The amount of promoting agent employed is determined on the basis of the water which is present in the catalyst mass prior to subjecting same to a drying and/or calcination operation. It is desirable, ordinarily, to use about 1 to about 50% by weight, preferably about 10 to about 40% of the promoting agent, based on the weight of water which is present in the catalyst mass, prior to subjecting the mass to a drying and/or calcination operation. It is preferred that the promoting agent be voltalized substantially or completely from the catalyst mass at about the calcination temperature. However, it is included within the scope of this invention to have a small residue from the promoting agent in the final catalyst product. After mixing the components of the catalyst mass, including the promoting agent of this invention, the mixture is generally subjected to an initial drying operation which is accomplished at a temperature of not more than about 400° F., preferably about 200° to about 250° F., and for a period of about 15 to 50 hours. During the drying step, when using a low boiling point promoting agent, it is found that a substantial part or all of the promoting agent is vaporized or volatilized from the catalyst mass. Beneficial effects in catalyst activity are obtained even though the promoting agent is substantially all or completely removed from the catalyst mass at a relatively low temperature, such as the drying operation. In other cases, where the promoting agent is less volatile, it remains in the catalyst mass for a longer period of time, and usually, until the calcination temperature is reached. It is not essential that the promoting agent be removed completely from the catalyst mass at the time of reaching calcination temperatures. It is also contemplated that part of the promoting agent be removed during the calcination operation, although it is preferred that substantially all of this agent is removed from the catalyst mass at the time of reaching the calcination temperature. This is desirable in order to avoid any undesirable effects from cracking the promoting agent at elevated temperatures.

The primary activating agent is incorporated into the catalyst mass as a water soluble salt such as, for example, chlorides, bromides, tartrates, iodides, nitrates and sulfates of the group III metals having an atomic number of at least 21 and not more than 89 which are enumerated hereinabove. The primary activating agent in the precursor form is added to the carrier material, e. g., alumina, in the sol or gel form, peptized or not peptized, for example, the sol may have a pH of 2.5 to 6.5 or the gel may have a pH of 6.5 to 11.0, before or after the addition of the other components, e. g., the platinum containing material, etc. Another alternative is to add the precursor primary activating agent to a dried and/or calcined carrier material before or after impregnation with the other components, e. g., a platinum containing material, etc. Specific examples of precursor materials which can be used in this invention are the chloride, bromide, nitrate and sulfate of scandium; the bromide, chloride, iodide, nitrate, sulfate and hydrous oxide of gallium; sodium gallate; gallium ammine chloride; the bromide, bromate, chloride, iodide, nitrate, sulfate and hydrous oxide of yttrium; the bromide, chloride, fluoride, iodate, nitrate, perchlorate, sulfate and hydrous oxide of indium; the bromate, bromide, chloride, nitrate and sulfate of lanthanum; the acetate, bromide, carbonate, chlorate, chloride, chloroplatinate, chromate, cyanide, dithionate, fluoride, hydroxide, iodide, nitrate, oxide perchlorate, phosphate, pyrophosphate, selenate, silicofluoride, sulfate, sulfite, thiocyanate and vanadate of thallium, etc.

Catalysts prepared in accordance with the present invention possess numerous outstanding advantages and have a wide field of utility. In general, it appears that these contact materials are suitable for any reactions which are susceptible to catalysis with platinum or palladium. They are useful in a variety of hydrocarbon conversion reactions, particularly those in which the hydrogen-carbon ratio is altered. Among the numerous reactions which lend themselves to catalysts by contact materials of the type disclosed herein are dehydrogenation, hydrogenation, hydrogenolysis, cracking, hydrocracking (i. e., cracking under hydrogen pressure), isomerization, oxidation, aromatization, cyclization, hydrodesulfurization, hydrocarbon synthesis, dealkylation, hydrodechlorination, dehydroxylation, alkylation, polymerization and hydrogen exchange systems. In general, these reactions may be carried out under the conventional reaction conditions of temperature, pressure, etc., with the catalyst described herein. However, in many instances, the activity of the new contact materials permits the employment of less severe conditions, especially lower temperatures and contact times, without any sacrifice in yield. A wide variety of organic compounds which may be dehydrogenated include naphthenes, paraffins, alkyl radicals in aralkyl compounds, butenes, sterols, glycerides, and many other organic compounds. By changing the reaction conditions in known manner, these catalysts are also effective for hydrogenation of organic compounds in general, especially fatty glycerides and olefins. They may also be employed in the hydrogenolysis of nitrobenzene to aniline and similar chemical changes. Another utilization lies in the dehydroxylation or demethylation, or both, of cresylic acid-type compounds. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. In addition to the more common cracking reactions, the contact materials of the present invention are especially suitable for cracking in the presence of hydrogen as in the hydroforming process in which the feed is customarily a low octane naphtha. In hydroforming with the novel catalysts, a substantial degree of sulfur removal occurs, and the reaction may readily be shifted to favor hydrosulfurization rather than reforming by changing the reaction conditions in a manner familiar to those skilled in the art. The synthesis of hydrocarbons from carbon monoxide and hydrogen in the presence of the new contact materials is also contemplated. In the field of oxidative reactions, numerous changes can be effected with the present catalysts including, for example, the transformation of sulfur dioxide to sulfur trioxide, the formation of nitric acid and also of hydrazine from ammonia, the conversion of urea into hydrazine and the oxidation of hydrocarbons in general. An example of a catalytic hydrodechlorination reaction of current importance, which may be catalyzed by the newly discovered agents, is that in which hydrogen converts trifluorotrichloroethane into trifluorochloroethylene and hydrogen chloride. The contact materials of the present invention are also suitable for the hydrogen exchange systems as exemplified by the hydrogenation of coal with decalin and tetralin. By reason of their aromatizing and cyclizing characteristics, they are outstanding in preparing benzene, toluene and the like in substantial yields from parafins and naphthenes and also for the production of more highly cyclized compounds such as naphthalene, anthracene and alkyl substituted derivatives thereof under suitable conditions. In addition, polymerization and alkylation reactions are responsive to these catalysts; for example, to the polymerization of olefins and the alkylation of aromatic compounds.

The catalysts prepared in accordance with the present invention are particularly adapted for reforming light hydrocarbon oils, e. g., naphtha stocks. In reforming naphtha or gasoline stocks with the catalyst disclosed herein, the conditions may be varied rather widely; thus temperatures of about 600° to about 1050° F. are suitable and the preferred range is from about 875° to about 950° F. Within these temperature limits, weight space velocities of about 0.05 to about 10.0 pounds of naphtha per hour per pound of catalyst in the reaction zone may be employed advantageously; however, space velocities at about 0.25 to about 5.0 provide better results. Hydrogen should be introduced into the reforming reactor at rates running from about 0.5 to about 20.0 mols of hydrogen per mol of hydrocarbon reactants. This hydrogen may be in admixture with light gaseous hydrocarbons. In fact, it is usually introduced by recycling the normally gaseous products, chiefly hydrogen along with up to about 45% of 1 to 3 carbon hydrocarbons, of the reforming reaction. The hydrogen serves an important function in maintaining the activity of the contact material by minimizing coke deposition thereon. While the total reaction pressure may be maintained at any value between about 50 to 1000 pounds per square inch gauge (p. s. i. g.), the best results are obtained by holding the reaction pressure within the range between about 100 and 750 p. s. i. g. In any event, the hydrogen pressure should not be allowed to become so great under any given set of reaction conditions that destructive hydrogenation is inaugurated, as this will result in a consumption rather than a net production of hydrogen in the reaction. However, the present invention is applicable to a process involving net consumption as well as net production of hydrogen. Either case is obtained by selecting proper reaction conditions within the ranges specified hereinabove.

The feed stock employed in the reforming operation is a light hydrocarbon oil, e. g., gasoline, naphtha and kerosene. For the most part, the naphtha fraction of a petroleum crude, whether cracked thermally or catalytically, or a straight run stock, or mixtures of the foregoing, is used as the feed stock to reforming operations. The naphtha fraction may have an initial boiling point of about 80° F. to about 275° F. and an end point of about 295° to about 525° F. The olefin content may vary from about 0 to 3 mol percent, and the octane number may vary from about 20 to about 75 CFRR clear. Platinum and/or palladium catalysts withstand the deteriorating effect of sulfur, however, high concentrations of sulfur may have an adverse effect on product distribution, consequently, it is preferred to employ stocks having not more than about 0.07 or 0.1% sulfur. Higher sulfur concentrations in the feed stock may produce less satisfactory results, although stocks having a sulfur concentration of about 0.01 to about 2.5% by weight can be used for the purposes of this invention.

As a result of the reforming operation, the catalyst can contain about 0.05 to about 5% carbon, which deactivates the catalyst. In order to restore catalyst properties, it can be treated under mild conditions with an oxygen containing gas having an oxygen partial pressure of 0.1 to 4 p. s. i. a., and a temperature of about 600° to about 1250° F., preferably about 850° to about 1000° F. to remove amorphous carbon, and then subjected to a more drastic treatment with an oxygen containing gas having an oxygen partial pressure of 4 to 200 p. s. i. a., more usually, 6 to 150 p. s. i. a., and preferably about 14.7 to about 100 p. s. i. a., and at a temperature of about 600° to 1600° F., more usually, about 900° to 1250° F. The mild or the drastic treatments can be used alone, or both can be used in sequence. When processing high sulfur containing stocks, at least 0.2% sulfur, the regeneration treatment may be followed with a hydrogen containing gas treatment at elevated temperatures, e. g., 500° to 1400° F. to restore catalytic properties.

In order to provide a better understanding of the present invention, reference will be had to a specific embodiment thereof.

The catalysts employed for the purpose of evaluating the present invention are described below.

CATALYST I 5682 grams of aluminum chloride, $AlCl_3 \cdot 6H_2O$, were dissolved in 20 liters of distilled water. 4400 cc. of concentrated ammonium hydroxide were added to the aluminum chloride solution with continuous agitation, thus causing a white alumina gel to precipitate. The resultant pH was 7.78 at 38° C. Thereafter the gel was filtered followed by washing the filtered gel with an aqueous solution of ammonium hydroxide 11 times. The 12th wash was conducted with a water solution and upon testing it was found that the gel contained a negligible quantity of chloride ions. The washed gel showed by ignition loss to have a solids content of 20.83% thus indicating that 1130 grams of alumina were present. 2666 grams of gel were slurried in 1644 cc. of distilled water and stirred for 2 hours. This gel had a pH of 8.90. It was then peptized with 32 cc. of glacial acetic acid diluted to a 64 cc. volume with water. After agitating the peptized solution for a ½ hour period, the pH was determined as 4.90 at 25° C. 400 cc. of gallium chloride solution, having a pH of less than 1, were added to the slurry thus producing a pH of 2.91 at 27° C. The slurry was then agitated for a ½ hour period followed by the addition of a platinum sulfide slurry. The platinum sulfide was prepared by saturating 400 cc. of solution containing 8 grams of chloroplatinic acid, $H_2PtCl_6 \cdot 6H_2O$, with hydrogen sulfide for ½ hour. The gallium chloride solution was prepared by dissolving 11.3 grams of gallium in aqua regia and then diluting with distilled water. Ammonium hydroxide was then added to cause the precipitation of gallium hydroxide. The gallium hydroxide was washed with a dilute solution of ammonium hydroxide and then filtered. Concentrated hydrochloric acid was added to the gallium hydroxide in order to dissolve the same. The activated alumina was dried in a Despatch oven at 235° F. for 20.25 hours. The dried catalyst was ground to a powder and then calcined for 3 hours at 1000° F. The calcined powdered catalyst was then pelleted into 3/16 inch pills before calcining again for a 3 hour period at 1000° F. The catalyst analyzed 0.48% platinum, 1.97% gallium and the remainder alumina.

CATALYST II

Aluminum chloride was reacted with ammonium hydroxide to precipitate alumina gel at a pH of 7 at 30° C. The alumina was filtered and then washed in order to remove substantially all of the chloride ions. 2760 grams of the washed alumina gel, containing 600 grams of anhydrous alumina, were slurried in 2½ liters of distilled water. 6.7 grams of 48% hydrofluoric acid diluted in 60 cc. of water were added to the alumina gel. In order to facilitate stirring an additional 500 cc. of distilled water were added and the mixture was stirred for a ½ hour period. At this point, the mixture had a pH of 8.49 at 29° C. The platinum sulfide slurry was prepared by dissolving 8.05 grams of chloroplatinic acid, $H_2PtCl_6 \cdot 6H_2O$, in 400 cc. of distilled water and saturating with hydrogen sulfide for ½ hour. The platinum slurry was added to the alumina gel and the mixture was stirred for an additional ½ hour. The pH of the entire mixture was 7.07 at 30° C. The active alumina was dried for 19 hours at 240° F. Following the drying, the catalyst was calcined for 3 hours at 100° F. The calcined catalyst was then ground into a powder and pelleted into 3/16 inch pills. The catalyst pills were calcined for an additional 3 hour period at 1000° F. The catalyst analyzed 0.48% platinum, 0.47% fluorine and the remainder alumina.

The feed stock having the characteristics as shown in Table I was used in this evaluation.

Table I

| | |
|---|---|
| Feed designation | A |
| Gravity, ° API | 51.3 |
| ASTM distillation, ° F.: | |
| IBP | 236 |
| 5 | 267 |
| 10 | 275 |
| 20 | 291 |
| 30 | 303 |
| 40 | 315 |
| 50 | 326 |
| 60 | 338 |
| 70 | 349 |
| 80 | 364 |
| 90 | 385 |
| 95 | 404 |
| E. P | 426 |
| Aniline point, ° F | 140 |
| Octane No. CFRR clear | 27.6 |
| Aromatics, vol. percent | 9.0 |
| Olefins, mol percent | 1.0 |
| Sulfur, wt. percent | 0.05 |
| Watson factor | 11.89 |
| Molecular weight | 134 |

The data obtained for the purpose of evaluating the present invention is presented in Table II below.

Table II

| Run No. | 1 | 2 |
|---|---|---|
| Feed | A | A |
| Catalyst | I | II |
| Operating conditions: | | |
| Temperature, ° F | 883 | 902 |
| Pressure, p. s. i. g. | 250 | 500 |
| Space vel. $W_o/hr./W_o$ | 2.00 | 1.00 |
| $H_2$ rate, S. C. F. B. | 4,627 | 4,495 |
| Catalyst charge, grams | 422 | 443 |
| Length of run, hrs. | 8 | 8 |
| Yields (output basis): | | |
| $C_5+$ gasoline, vol. percent | 69.9 | 69.3 |
| 100% $C_4$ gasoline, vol. percent | 81.4 | 86.4 |
| 10# RVP gasoline, vol. percent | 76.1 | 75.0 |
| Polymer, vol. percent | 4.7 | 1.5 |
| Dry gas, wt. percent | 13.6 | 15.8 |
| Butanes, vol. percent | 11.5 | 17.1 |
| Octane No., CFRR clear: | | |
| $C_5+$ liquid | 95.4 | 87.4 |
| 100% $C_4$ gasoline | 95.7 | 89.6 |
| 10# RVP gasoline | 95.3 | 88.1 |
| Space velocity for $C_5+$ gasoline of 85 CFRR clear | 4.59 | 1.33 |

From a comparison of runs 1 and 2 in Table II above, it can be seen that the platinum catalyst which was activated with gallium oxide was exceptionally more active than another platinum catalyst activated with hydrogen fluoride. Furthermore, it should be noted from an inspection of the preparation of Catalyst I that the total mixture prior to drying had a pH of 2.68 at 28° C. For the purpose of this invention, it is preferred to maintain a final pH of the mixture to drying in the range of about 0 to about 4, preferably about 1 to about 3. A high acidity is desirable from a standpoint of producing a catalyst of high activity. It is known in the art that a fluorine containing platinum catalyst is exceptionally high in activity, however, from the data presented in Table II above, it is to be noted that the activating agent of the present invention is particularly more active than a fluorine containing platinum catalyst.

Having thus provided a description of the present invention along with a specific example thereof, it should be understood that no undue limitations or restrictions are to be imposed by reason thereof, but that the scope of the present invention is defined by the appended claims.

We claim:

1. A catalyst comprising from about 0.01 to about 5% by weight of a catalytic agent selected from the group consisting of platinum and palladium in combination with from about 0.05 to about 20% by weight, based on the total catalyst, of a compound of a group III metal having an atomic number of at least 21 and not more than 89 supported on an inorganic metal oxide not reducible at a temperature below about 1200° F.

2. A catalyst comprising about 0.01 to about 15.0% of a catalytic agent selected from the group consisting of platinum and palladium in combination with about 0.05 to about 20% of a compound of a group III metal having an atomic number of at least 21 and not more than 89 supported on an inorganic metal oxide.

3. A method of preparing a catalyst which comprises combining an ammine complex of a metal selected from the group consisting of platinum and palladium, a carrier material comprising an inorganic oxide and not reducible at a temperature below about 1200° F. and a compound of a group III metal having an atomic number of at least 21 and not more than 89, and treating the resultant mixture to obtain a residue of a metal selected from the group consisting of platinum and palladium and a compound of a group III metal having an atomic number of at least 21 and not more than 89 supported on said carrier material.

4. A method of preparing a catalyst which comprises combining a compound of a metal selected from the group consisting of platinum and palladium, an inorganic metal oxide not reducible at a temperature below about 1200° F., a compound of a group III metal having an atomic number of at least 21 and not more than 89, and a secondary activating agent selected from the group consisting of zinc, cadmium, mercury and compounds thereof, and treating the resultant mixture in order to obtain a residue of a metal selected from the group consisting of platinum and palladium and a compound of the group III metal supported on the inorganic metal oxide.

5. A method of preparing a catalyst which comprises combining a compound of a metal selected from the group consisting of platinum and palladium, a compound of a group III metal having an atomic number of at least 21 and not more than 89, a hydrous carrier material comprising an inorganic oxide and not reducible at a temperature below about 1200° F., and a water soluble promoting agent selected from the group consisting of an alcohol and a ketone, and heating the resultant mixture at an elevated temperature and for a sufficient period of time to obtain a residue of a metal selected from the group consisting of platinum and palladium and a compound of the group III metal supported on the carrier material.

6. A method of preparing a catalyst which comprises combining platinum sulfide, a compound of a group III metal having an atomic number of at least 21 and not more than 89, and an inorganic metal oxide not reducible at a temperature below about 1200° F., and calcining the resultant mixture at an elevated temperature to obtain a catalyst comprising platinum and a compound of the group III metal supported on the inorganic metal oxide.

7. A catalyst comprising about 0.01 to about 5.0% of a catalytic agent selected from the group consisting of platinum and palladium in combination with from about 0.05 to about 20% by weight, based on the total catalyst, of a compound of a group III metal having an atomic number of at least 21 and not more than 89 supported on alumina.

8. A catalyst comprising a catalytic agent selected from the group consisting of platinum and palladium in combination with from about 0.05 to about 20% by weight, based on the total catalyst, of a compound of gallium supported on a carrier material comprising an inorganic oxide and not reducible at a temperature below about 1200° F.

9. A catalyst comprising about 0.1 to about 2.5% of a catalytic agent selected from the group consisting of platinum and palladium in combination with about 0.1 to about 10% of a compound of gallium supported on alumina.

10. A catalyst comprising a catalytic agent selected from the group consisting of platinum and palladium in combination with from about 0.05 to about 20% by weight, based on the total catalyst, of gallium oxide supported on alumina.

11. A catalyst comprising about 0.01 to about 5% of platinum, about 0.3 to about 5% of gallium oxide, and the remainder alumina.

12. A catalyst comprising about 0.48% platinum, gallium oxide having about 1.97% gallium in the catalyst, and the remainder alumina.

References Cited in the file of this patent

UNITED STATES PATENTS

| | | |
|---|---|---|
| 2,384,501 | Streicher | Sept. 11, 1945 |
| 2,636,819 | Streicher | Apr. 28, 1953 |
| 2,662,861 | Riblett et al. | Dec. 15, 1953 |

OTHER REFERENCES

"Catalysis," by Berkman, Morrell and Eglov, page 714 (1940), published by Reinhold Pub. Corp., New York, N. Y.

U. S. DEPARTMENT OF COMMERCE
PATENT OFFICE

CERTIFICATE OF CORRECTION

Patent No. 2,814,599

November 26, 1957

Philip A. Lefrancois et al.

It is hereby certified that error appears in the printed specification of the above numbered patent requiring correction and that the said Letters Patent should read as corrected below.

Column 1, line 25, for "hitgh" read --high--; same line, for "liqud" read --liquid--; column 4, line 59, for "producting" read --producing--; column 5, line 24, for "exanthate" read --xanthate--; column 7, line 11, for "ethylene," read --ethylene--; column 8, line 31, for "catalysts" read --catalysis--; lines 67 and 68, for "hydrosulfurization" read --hydrodesulfurization--; column 11, line 12, for "100° F." read --1,000° F.--.

Signed and sealed this 25th day of March 1958.

(SEAL)
Attest:

KARL H. AXLINE
Attesting Officer

ROBERT C. WATSON
Commissioner of Patents